US010030556B2

(12) United States Patent
McGinn et al.

(10) Patent No.: US 10,030,556 B2
(45) Date of Patent: Jul. 24, 2018

(54) GLASS CATALYST COMPOSITIONS FOR IMPROVED HYDROTHERMAL DURABILITY

(71) Applicant: University of Notre Dame du Lac, Notre Dame, IN (US)

(72) Inventors: Paul J. McGinn, Granger, IN (US); James Zokoe, Notre Dame, IN (US)

(73) Assignee: University of Notre Dame du Lac, South Bend, IN (US)

( * ) Notice: Subject to any disclaimer, the term of this patent is extended or adjusted under 35 U.S.C. 154(b) by 118 days.

(21) Appl. No.: 15/211,830

(22) Filed: Jul. 15, 2016

(65) Prior Publication Data

US 2017/0016367 A1    Jan. 19, 2017

Related U.S. Application Data

(60) Provisional application No. 62/192,907, filed on Jul. 15, 2015.

(51) Int. Cl.
| | |
|---|---|
| *F01N 3/035* | (2006.01) |
| *B01J 23/10* | (2006.01) |
| *B01J 35/04* | (2006.01) |
| *B01D 53/94* | (2006.01) |
| *F01N 3/02* | (2006.01) |
| *B01J 21/08* | (2006.01) |
| *B01J 37/02* | (2006.01) |
| *B01J 37/08* | (2006.01) |
| *F01N 3/021* | (2006.01) |
| *F01N 3/022* | (2006.01) |

(52) U.S. Cl.
CPC ............. *F01N 3/035* (2013.01); *B01D 53/94* (2013.01); *B01D 53/944* (2013.01); *B01J 23/10* (2013.01); *B01J 35/04* (2013.01); *B01D 2255/202* (2013.01); *B01D 2255/2022* (2013.01); *B01D 2255/2065* (2013.01); *B01D 2255/20715* (2013.01); *B01D 2255/30* (2013.01); *B01D 2255/407* (2013.01); *B01D 2255/908* (2013.01); *B01D 2255/915* (2013.01); *B01D 2255/9155* (2013.01); *B01D 2258/012* (2013.01); *B01J 21/08* (2013.01); *B01J 37/0219* (2013.01); *B01J 37/0234* (2013.01); *B01J 37/08* (2013.01); *B01J 2523/00* (2013.01); *F01N 3/0212* (2013.01); *F01N 3/0222* (2013.01); *F01N 3/0226* (2013.01); *F01N 2330/06* (2013.01); *F01N 2330/10* (2013.01); *F01N 2330/12* (2013.01); *F01N 2370/00* (2013.01); *F01N 2510/065* (2013.01)

(58) Field of Classification Search
CPC .... F01N 3/035; F01N 3/0212; F01N 2330/10; F01N 2330/12; F01N 2370/00; F01N 2510/065; F01N 3/0222; F01N 2330/06; F01N 3/0226; B01D 53/944; B01D 53/94; B01D 2255/2065; B01D 2258/012; B01D 2255/908; B01D 2255/9155; B01D 2255/2022; B01D 2255/407; B01D 2255/30; B01D 2255/20715; B01D 2255/915; B01D 2255/202; B01J 23/10; B01J 35/04; B01J 37/0234; B01J 37/08; B01J 37/0219; B01J 21/08; B01J 2523/00
See application file for complete search history.

(56) References Cited

U.S. PATENT DOCUMENTS

| | | |
|---|---|---|
| 8,356,475 B2 | 1/2013 | McGinn et al. |
| 2004/0259731 A1 | 12/2004 | Yan |
| 2008/0254973 A1 | 10/2008 | Okamoto et al. |
| 2009/0004078 A1 | 1/2009 | Mao et al. |
| 2009/0031712 A1 | 2/2009 | McGinn et al. |
| 2010/0092358 A1 | 4/2010 | Koegel et al. |

OTHER PUBLICATIONS

ISA/US, International Search Report and Written Opinion issued on PCT application No. US16/42596, dated Nov. 4, 2016, 11 pages.
The Intl. Bureau of WIPO, IPRP, Written Opinion of the International Searching Authority issued on PCT/US2016/42596, dated Jan. 25, 2018, 6 pages.

*Primary Examiner* — Anthony J Zimmer
(74) *Attorney, Agent, or Firm* — Greenberg Traurig, LLP

(57) ABSTRACT

A diesel soot filter includes a substrate having a surface disposed at least partially within a fluid path of the diesel soot filter. A glass catalyst is disposed on the surface of the substrate such that an exhaust gas contacts at least a portion of a surface of the glass catalyst as the exhaust gas moves within the diesel soot filter. The glass catalyst comprises a plurality of alkali metal ions disposed within the glass catalyst and releasable to the surface of the glass catalyst at a controlled rate and the alkali metal ions combust with the soot as the exhaust gas travels along the fluid path. An oxide basis of the glass catalyst comprises Silicon (Si), Potassium (K), Cesium (Ce), and Zirconium (Zr).

7 Claims, 13 Drawing Sheets

US 10,030,556 B2

GLASS CATALYST COMPOSITIONS FOR IMPROVED HYDROTHERMAL DURABILITY

CROSS REFERENCE TO RELATED APPLICATION

This application is a non-provisional application claiming priority from U.S. Provisional Application Ser. No. 62/192,907, filed Jul. 15, 2015, and incorporated herein by reference in its entirety.

FIELD OF THE DISCLOSURE

The present description relates generally to glass catalyst compositions and more particularly to glass catalyst compositions for improved hydrothermal durability.

BACKGROUND OF RELATED ART

A diesel particulate filter (DPF) is used to remove soot from diesel exhaust. The exhaust passes through the DPF and soot is captured with an efficiency of up to 99%. Over time the soot accumulates in the filter and must be eliminated to avoid development of a large back pressure in the exhaust system. Soot removal occurs through what is termed regeneration of the filter.

One novel approach uses a potassium containing glass as a catalyst, in which $K^+$ ions are present within a silicate matrix. For instance, in U.S. Pat. No. 8,356,475, incorporated herein by reference in its entirety, discloses the use of DPF having potassium containing glasses as catalysts for soot oxidation. This approach relies on the slow passive release of potassium from a silicate glass network to provide for renewal of the catalytic surface activity of the glass. With exposure to water vapor, ion exchange of $H^+$ and potassium ions can occur, promoting migration of $K^+$ to the glass catalyst surface and providing a continuous supply of potassium for long term catalytic soot combustion. This mitigates the effect of loss of the active potassium species during combustion by providing new ions over time. In at least one trial, for the glass compositions disclosed in the earlier issued patent, soot combustion temperatures in the range of approximately 375-400° C. were achieved.

While the previous DPF and catalysts are sufficient for its intended purposes, there remains an identifiable need for various additional DPF and catalyst combinations for differing operating conditions.

DETAILED DESCRIPTION

The following description of example methods and apparatus is not intended to limit the scope of the description to the precise form or forms detailed herein. Instead the following description is intended to be illustrative so that others may follow its teachings.

A DPF and glass catalyst must survive the harsh conditions of the diesel exhaust environment for extended periods of time. Diesel exhaust is composed of roughly 10% $O_2$, 5% $CO_2$, and 5-7% $H_2O$ vapor with varying levels of $NO_x$ (~200 ppm) balanced with $N_2$. In addition, there can be sulfur compounds and hydrocarbons present. It will be appreciated by one of ordinary skill in the art, however, that the exhaust composition will vary with engine size, fuel source, and operating conditions. In addition, the temperature of the exhaust normally varies between approximately 250 and 600° C., with brief excursions to even higher temperatures being possible. This means that any glass must have appropriate resistance to elevated temperatures, structural changes caused by hydrothermal exposure, ash buildup, sulfur, etc.

Durability in this hydrothermal environment may be challenging for a glass catalyst. For instance, beneficial vapor phase hydration of the glass is expected to occur in this ambient, with an ion exchange process promoting $K^+$ ion diffusion to the catalyst surface, where potassium hydroxide and carbonate can form. This helps to maintain the catalytic activity of the glass. If this process occurs too quickly, the glass will not have a sufficient activity lifetime. However, if the glass is too stable there will be an imbalance between the rate of loss and resupply of the mobile $K^+$ ions which will leave a K depleted layer and diminished catalytic activity. Hence a primary challenge in defining glass compositions that can serve as effective catalysts in a diesel exhaust environment is strike a balance between the durability sufficient to give long term catalytic activity, and the needed instability for desired catalytic activity properties.

Figure 1:
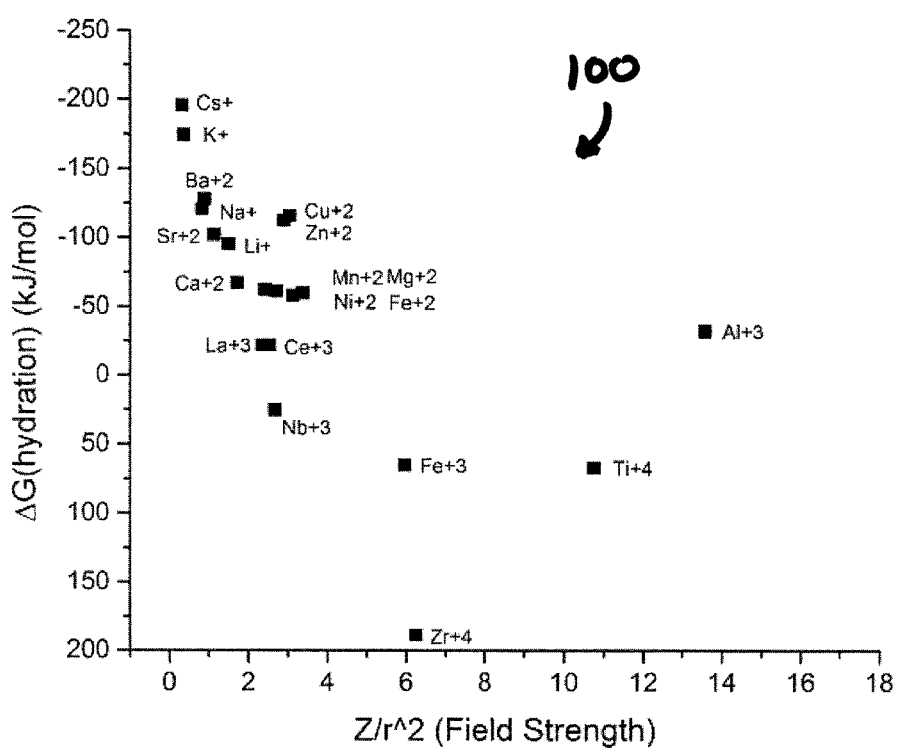
FIG. 1 is a plot showing a range of hydration energies for common glass additives versus their respective ionic field strength.

The general affinity for a glass to undergo leaching (chemical degradation) can be described by a thermodynamic treatment based on the cumulative free energy of hydration of the individual glass components and the ionic field strength of the constituent cations as a metal oxide or as incorporated glass specie. These processes occur simultaneously in accord to their thermodynamic equilibrium when exposed to hydrated environments. Turning to the drawings, FIG. 1 shows a plot 100 of the range of hydration energies for common glass additives versus their respective ionic field strength (F) where $F=Z/r^2$ (ionic charge/ionic radius$^2$).

Using a simple thermodynamic approach, by considering ionic field strength along with the relative partial molar free energies of hydration, a glass composition should be able to be tailored to control the tendency for chemical degradation, and also for catalytic activity. The addition of low field strength, highly negative free energy of hydration elements (e.g. $K^+$) will cause greater susceptibility to chemical degradation due to increased leaching of these elements from the glass. A hydrated, depleted surface results from the leaching and extends further into the surface with longer exposure times. The growth of this hydrated layer is governed by a square root dependence with respect to time since the growth of the surface layer eventually impedes further leaching through the depleted zone.

A physical crust (structural degradation) can also develop on the glass surface due to extensive leaching and re-precipitation of mobile elements. This phenomenon is well known, and was recently extensively investigated in the context of archeological glasses and nuclear storage glasses. Potash and lime containing glasses when exposed to atmospheric gasses such as $SO_2$, $NO_x$, and $CO_2$ will form a weathering crust of sulfates, nitrates, and carbonates respectively. This crust can become a barrier for further ion leaching and the structural reformation at the surface can reach a limiting thickness, depending on factors including glass composition, atmospheric gas composition, and exposure time.

To design durable glasses, glass reactant species are selected based on hydration reactions that are expected to occur between the glass and an aqueous solution (acidic or basic). This is based on expectations as to whether cations in the glass will anionically complex with silica or other oxides. This is determined from their relative anionic force, which reflects their field strength (F). Cation species can be classified as to whether they are network formers (i.e. ions with high F), network modifiers (i.e. ions with low F), or intermediate cations, that can act as either network formers or network modifiers. Potassium and sodium are examples of network modifiers (low F) that are susceptible to leaching. For durable glass design, one considers the field strength along with the relative partial molar free energies of the hydration reactions of the cation species.

In accordance with the teachings of the present application, a glass catalyst composition for improved hydrothermal stability in diesel exhaust applications is disclosed. In one example, the primary mechanism of improvement is by reduction or elimination of $CaCO_3$ formation on the glass catalyst surface. Still further, in one example, the best implementation for synthesizing and applying the catalysts is through a sol-gel approach, as previously disclosed in U.S. Ser. No. 13/691,173, filed on Nov. 30, 2012, entitled "Glass Catalysts for Soot Combustion and Methods of Manufacturing the Same," and incorporated herein by reference in its entirety. In yet another example, the disclosed glass catalyst may be layered as a second application (i.e. a bi-layer glass) onto another catalytic glass layer (e.g. KCS-1). Described herein is a comparison with the previous glass composition (i.e., KCS-1), as disclosed in U.S. Pat. No. 8,356,475 and U.S. Ser. No. 13/691,173 (US 2013/0345048 A1). The presently disclosed glass composition exhibits better hydrothermal stability, which is desirable in an exhaust environment.

Comparative Example—Testing of KCS-1 Glass

In one testing example, a plurality of cordierite DPF substrates were coated with a potassium-rich catalytic glass film and tested for activity and long term chemical and physical durability. In this example, a catalytic glass with the composition 52 wt % $SiO_2$, 35 wt % $K_2O$, and 13 wt % CaO (~At %:47% Si, 40% K, 13% Ca respectively), which was previously shown to be a K-glass catalyst was utilized. This composition is commonly referred to as KCS-1. For sol gel synthesis of this glass composition, tetraethylorthosilicate (TEOS) ($Si(OC_2H_5)_4$, 98%), calcium nitrate tetrahydrate ($Ca(NO_3)_2 \cdot 4H_2O$, ACS reagent) and potassium nitrate ($KNO_3$, ACS reagent) were used as starting materials, as previously described. TEOS was dissolved in ethanol. Calcium nitrate and potassium nitrate were dissolved in DI water and added to the TEOS-ethanol mixture. 10 cP was chosen as the coating viscosity for cordierite filter samples which produced a thin glass film of ~2 µm. The chosen films are thin enough so that when coated onto a cordierite filter they do not fill pores and cause a negligible pressure drop along the filter.

Figure 2:
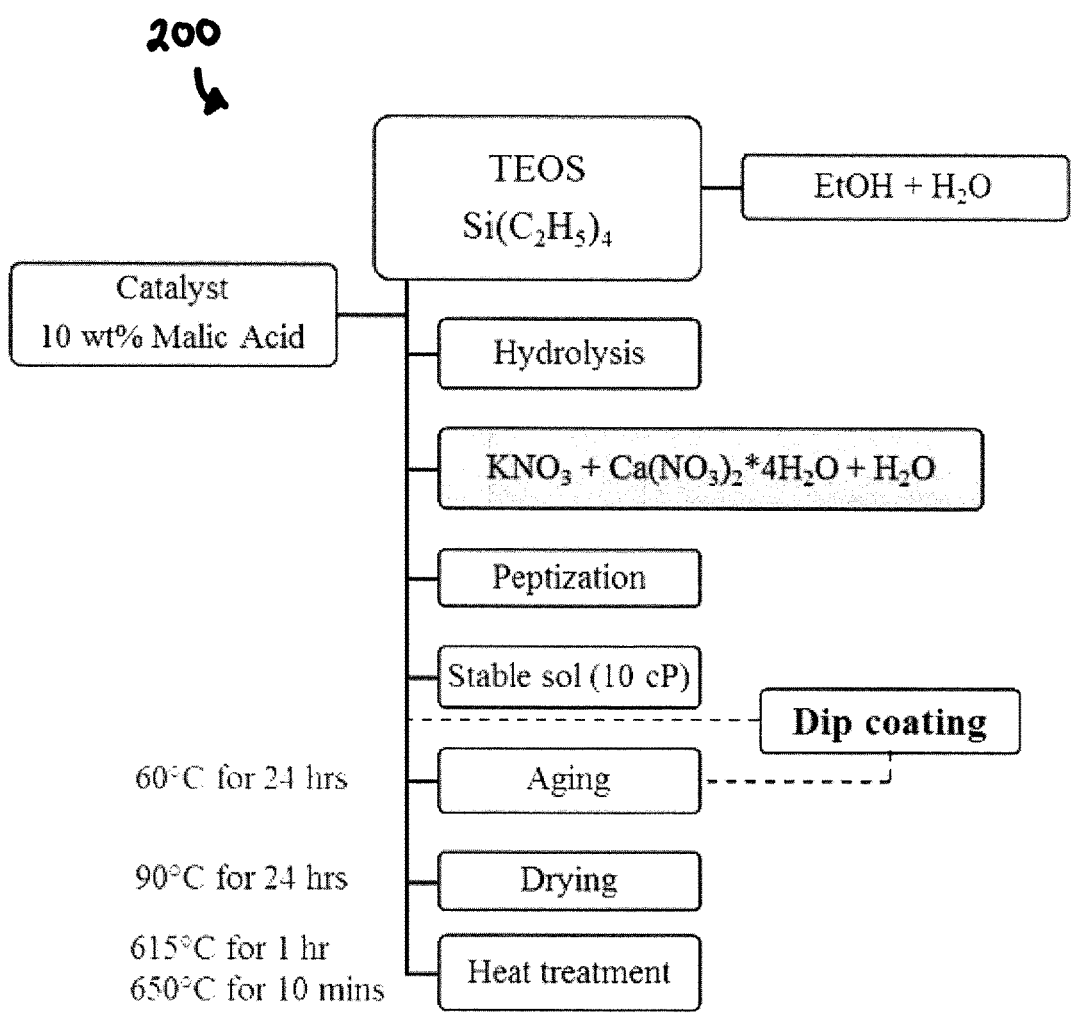
FIG. 2 is a sample process for manufacturing an example glass catalyst.

Flow through cordierite filter slices (8×8×3 mm3) with 1 mm channels were dip coated with the KCS-1 sol following a process 200 depicted in FIG. 2. This sample size and mass is compatible with thermal gravimetric analysis (TGA) for catalytic activity characterization. In this example, samples were submerged in the sol and a vacuum was applied to degas and impregnate the inner pore structure of the cordierite. The excess sol was subsequently drained and blown off the filter slices and the samples were then dried and aged. High temperature burnout of the precursors was conducted in air, with the samples heated to 650° C., held for 10 min hold to ensure complete removal of nitrates from the glass, and then furnace cooled to room temperature. A consistent 5 wt % catalyst loading was achieved through this method.

Flat glass slices of KCS-1 composition were used for scanning electron microscopy and energy dispersive X-ray spectroscopy (SEM/EDS) surface characterization. These were made by melting a stoichiometric mixture of carbonate powders. 8×5×3 mm (L×W×H) rectangular slices were subsequently cut from the cooled bulk glass. The slices were then dry polished without a polishing medium (i.e. water, oil, etc.) with SiC (180, 600 grit) and alumina (5, 0.5 µm) pads to a scratch-free finish. Water was avoided to circumvent alkali leaching from the surface during polishing.

Structural and chemical changes near the surface (~1-2 µm) were characterized by scanning electron microscopes energy-dispersive X-ray spectroscopy (SEM-EDS) and attenuated total reflectance Fourier transform infrared spectroscopy (ATR-FTIR). While any suitable analytical device will suffice, SEM-EDS analysis was performed on a Carl Zeiss LEO EVO-50 with an Oxford INCA energy dispersive spectrometer. ATR-FTIR was performed on a Bruker Tensor 27 FTIR with a platinum single reflection diamond ATR module.

Hydrothermal (chemical) degradation was studied on KCS-1 samples exposed to humidified gas at temperatures between 500-700° C. Flowing air or $N_2$ (120 mL/min) was bubbled through a heated water bath (40° C.) to accumulate ~7% $H_2O$ vapor before it was fed into a quartz tube furnace which housed the filter samples. The 7% $H_2O$ content was chosen to approximate the diesel exhaust environment. The line connecting the water bubbler and furnace was heated above 40° C. with heating tape to assure no condensation occurred upstream of the samples. Hydrothermal tests were conducted for 2 hours before the catalytic activity was characterized by TGA.

Catalytic activity was characterized by the soot ignition temperature ($T_{ig}$) and the 50% soot conversion temperature ($T_{50}$) measured by a TA Instruments 2950 high resolution thermogravimetric analyzer (HR-TGA). The TGA was programmed to slow the heating ramp rate from 20° C./min to 2° C./min when the onset of weight loss was detected. A mixed diesel exhaust gas analogue of composition 10% $O_2$, 5% $CO_2$, 3% $H_2O$ with balance $N_2$ was used. Any activity degradation, whether it is due to hydrothermal surface modification or a loss of active potassium, will be detected as an increase in the soot oxidation temperature.

To closely mimic the real conditions experienced by a DPF on a diesel engine, "loose" soot contact achieved by flame soot deposition was utilized for all tested samples. KLEAROL® white mineral oil with ~1 ppm sulfur was used as the fuel oil for soot generation. This fuel was chosen to mitigate any degradation effects that might result from sulfate formation.

Figure 3:
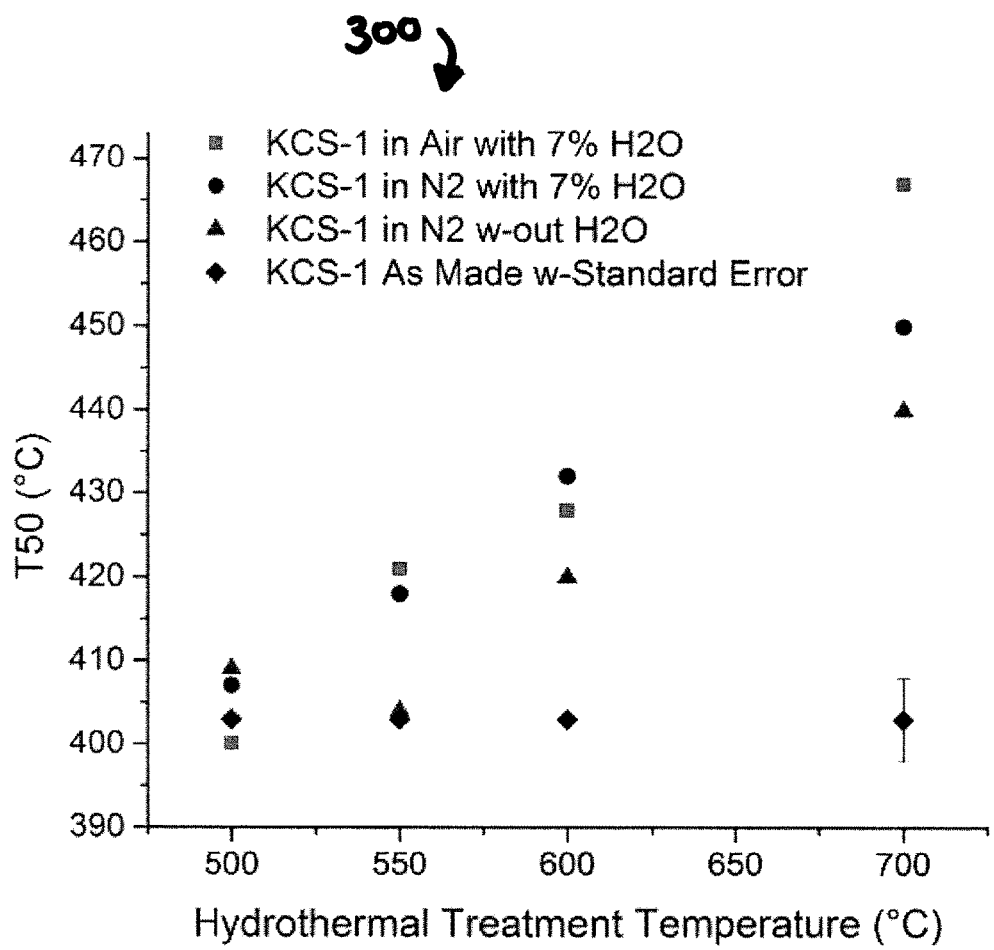
FIG. 3 is a plot showing the results of TGA characterization soot oxidation of an example glass catalyst.

The glass soot oxidation performance (TGA $T_{50}$) was examined after 2 hour exposures to temperatures ranging from 500 to 700 C under $N_2$ and air with 7% water vapor $N_2$ and without water vapor. FIG. 3 shows a plot 300 of the results of TGA characterized soot oxidation ($T_{50}$ temperature) after 2 hour exposures to temperatures ranging from 500 to 700° C. under $N_2$ and air, both with and without water vapor.

In particular, the plot 300 of FIG. 3 shows the results of TGA characterized soot oxidation ($T_{50}$ temperature) of KCS-1 glass after 2 hour exposures to temperatures ranging from 500-700° C. under air with water vapor. As can be seen from the plot 300, there is a direct relationship between catalytic deactivation (increase in oxidation temperature) and hydrothermal exposure temperature. An increase in hydrothermal exposure temperature increases the amount of measured catalytic deactivation. Exposure to water vapor has been shown to create precipitated layers of mobile elements (i.e. alkali carbonates or sulfates). Additionally, it can be observed from the plot 300 that hydrothermal exposure above the $T_s$ (700° C.) in air resulted in a larger decrease in activity relative to the similar testing condition in $N_2$. The availability of $CO_2$ in air will facilitate carbonate formation on the surface, reducing the total surface potassium available for soot oxidation and thus further decrease catalytic activity.

Figure 4:
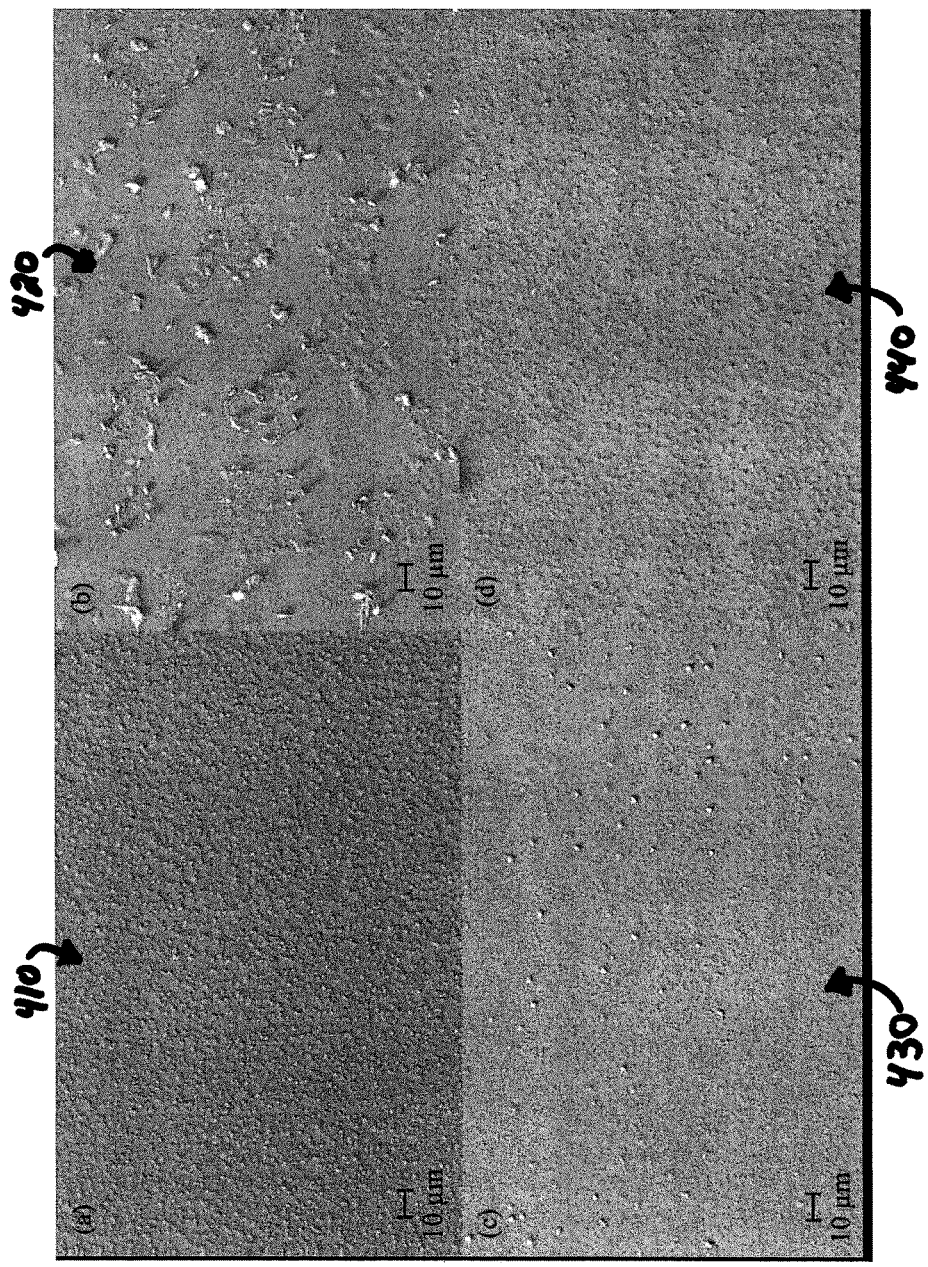
FIG. 4 shows SEM images of an example glass catalyst surface after hydrothermal exposures.

In another demonstration, samples of flat, polished KCS-1 glass were exposed to a range of temperatures in a hydrothermal environment to gain a better understanding of changes to the glass surface during high temperature hydrothermal degradation. The samples were held at temperatures of 300, 500, 600, and 700° C. for two hours in flowing humidified air (7% $H_2O$ vapor, 120 mL/min). FIG. 4 shows a plurality of SEM images of the KCS-1 glass surfaces after the hydrothermal exposures. More precisely, FIG. 4 provides SEM images of polished KCS-1 melt glass slices after 2 hour hydrothermal exposures under air at (a) 300° C. (reference 410) and (b) 500° C. (reference 420) (c) 600° C. (reference 430) and (d) 700° C. (reference 440). Separate samples were used for each testing condition.

As can be appreciated, smaller precipitates with increased surface coverage are observed at higher temperatures (e.g., 430, 440). EDS characterization through point and area (~1 $mm^2$) analysis was performed at five or more particulate and flat glass points per sample. The data is tabulated in Table 1 below. It will be appreciated from Table 1 that the K/Ca ratio ("rectangular spectra") increases from an as-synthesized value of 2.80 to a value of 3.69 at a treatment temperature of 300° C. but decreases as the treatment temperature increases to a value of 2.93 after 700° C. exposure. However, all values are higher than the as-made value, i.e. the precipitates are K-enriched. The K/Ca ratio of the as-synthesized glass was lower than the theoretical value of 3.07, possibly due to K sublimation at the melt synthesis temperature of 1200° C. Measurements of the particulates and the surrounding flat regions reveal an increase in K content of the particulates and a corresponding localized decrease of K in adjacent regions which exhibit K/Ca ratios ranging from 2.43 to 2.75. At temperatures above 300° C., carbon was not detected in any appreciable amount in the flat regions near particulates, suggesting the accumulations are a mixture of K and Ca carbonates formed from nearby carbon sources. The Si detected in the point measurements of the particulates is likely from the underlying glass.

TABLE 1

EDS measurements of 300-700° C. hydrothermally treated KCS-1 glass

| Hydrothermal Treatment Temperature (° C.) | C | O | Si | K | Ca | K/Ca Ratio |
|---|---|---|---|---|---|---|
| 1 $mm^2$ EDS Rectangular Spectra | | | | | | |
| 25 (As Made) | 0 | 67.5 | 16.4 | 11.8 | 4.22 | 2.80 |
| 300 | 29.7 | 32.4 | 14.7 | 18.3 | 4.95 | 3.69 |
| 500 | 15.6 | 39.3 | 18.1 | 20.7 | 6.33 | 3.27 |
| 600 | 11.3 | 42.2 | 19.1 | 20.8 | 6.56 | 3.18 |
| 700 | 11.7 | 42.2 | 18.7 | 20.5 | 6.98 | 2.93 |
| EDS Point Spectra Avg. of Participates | | | | | | |
| 300 | 31.5 ± 5.06 | 24.7 ± 1.28 | 15.3 ± 3.15 | 23.2 ± 2.44 | 5.21 ± 1.23 | 4.46 ± 1.15 |
| 500 | 19.7 ± 9.07 | 41.6 ± 7.45 | 7.52 ± 6.42 | 28.9 ± 9.72 | 2.32 ± 2.27 | 12.4 ± 12.9 |
| 600 | 15.1 ± 5.84 | 41.8 ± 4.04 | 15.2 ± 2.93 | 21.2 ± 2.40 | 6.65 ± 1.20 | 3.19 ± 0.680 |

Figure 5B:
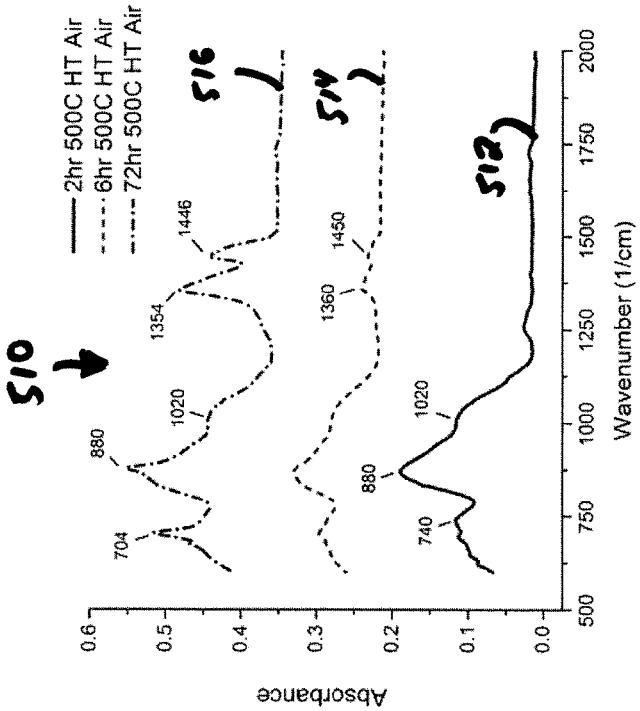
FIGS. 5A and 5B show ATR-FTIR spectra of glass surfaces before and after hydrothermal exposure.
Figure 5A:
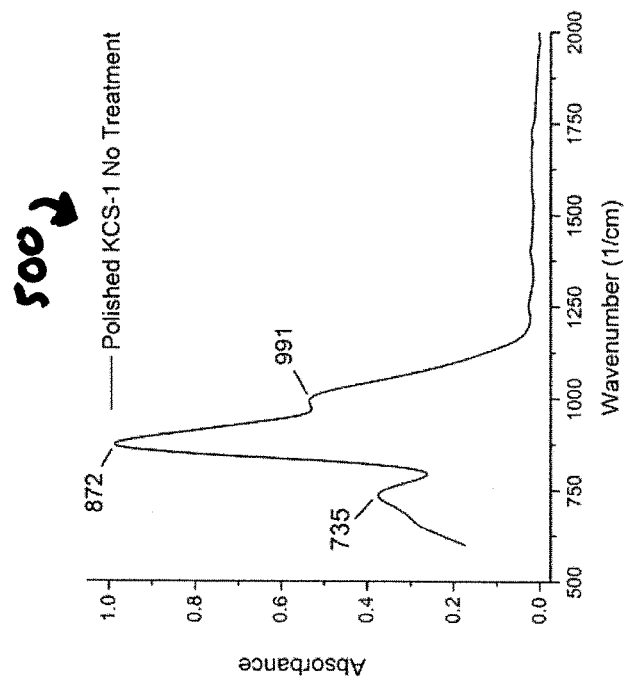

To better understand the nature of precipitate formation, samples of polished KCS-1 glass were exposed to equivalent 500° C. hydrothermal conditions and analyzed by ATR-FTIR spectroscopy as seen in FIGS. 5A and 5B. Referring to the figures, FIG. 5A illustrates a plot 500 of an ATR-FTIR spectroscopy of the as-made polished KCS-1 glass, which reveals peaks at 735, 872, and 991 $cm^{-1}$. The peaks at 735 and 991 $cm^{-1}$ represent the symmetric and asymmetric Si—O—Si stretching respectively while the peak at 872 $cm^{-1}$ corresponds to the non-bridging Si—O—X stretching with X representing K or Ca.

FIG. 5B, meanwhile illustrates a plot 510 showing the IR spectra for KCS-1 glass samples exposed to extended hydrothermal conditions for 2 (reference 512), 6 (reference 514), and 72 (reference 516) hours. Characteristic bands for calcium and potassium carbonate seen at 1350-1450 $cm^{-1}$ develop with increasing exposure time. The development and sharpening of the peaks at 710 and 880 $cm^{-1}$ are also indicative of carbonate formation. Dual peak formation in the 1350-1450 $cm^{-1}$ region was not previously seen in a potash glass corrosion study.

To clarify these results, a range of varying K—Ca mixtures of ground KCS-1 glass, potassium carbonate, and calcium carbonate powders (10% total carbonates by weight) were prepared and mixed by mortar and pestle and characterized by ATR-FTIR for comparison. The dual peak formation in the carbonate wavenumber region was seen only in samples where K2CO3 was present. The existence of these two peaks in the 500° C. hydrothermally treated sample in FIG. 5B and the large K/Ca ratio of the precipitates measured by EDS (Table 1) can thus allow characterizing the precipitates seen in FIG. 4 (reference 420) as a potassium dominated mixture of $K_2CO_3$ and $CaCO_3$.

It is known that potassium carbonate is active for soot oxidation while $CaCO_3$ is not. Thus, surface coverage by $CaCO_3$ creates an inactive region, and leads to an overall decrease in catalytic activity. Elimination of $CaCO_3$ formation should enhance durability of catalytic activity over long times in a hydrothermal environment.

Disclosed Glass Composition (KCeSZ-1)

One form of catalyst degradation (i.e. partial catalytic deactivation) which was demonstrated above in the hydrothermal studies of KCS-1 was caused by $CaCO_3$ formation on the surface after prolonged exposure to humid gas. Calcium (Ca) compounds show minimal activity in carbon oxidation. Therefore, formation of $CaCO_3$ results in decreased activity on the surface of the glass catalyst.

Thus, the disclosed glass composition replaces the stabilizing ion Ca in the K-glass composition with an ion that can provide stabilization of the K ions in the silicate matrix while also being catalytically active in soot oxidation, thereby improving the useful lifetime performance of the glass catalyst.

$CeO_2$ has shown significant oxygen storage capacity which aids in catalytic oxidation of soot. Cerium ($Ce^{3+}$) as a glass element acts as a stronger network former than Ca due to the higher $\Delta G_{hydration}$ of −22.0 kJ/mol. As such, complete substitution of Ce for Ca in the K-glass composition may negate any catalytic degradation due to inactive species formation on the surface. Additionally, a higher amount of K can be stabilized in the glass because the Ce free energy of hydration is less negative than Ca at −67.4 kJ/mol. When hydrothermal stability near the KCS-1 composition can be achieved, the additional K in the catalyst will be able to more efficiently replenish the surface with K to compensate the loss of K due to sublimation during soot oxidation. To demonstrate this, catalytic activity characterization and hydrothermal durability testing was performed to compare the altered compositions against the KCS-1 glass catalyst. Partial Zr substitution was also examined as it has a lower $\Delta G_{hydration}$ and a greater field strength than Ce.

Sample Preparation

Initial tailoring of the alternative K-glass composition was performed by substituting Zr or Ce for Ca in the KCS-1 composition and also by increasing the K content. For instance, glass compositions as disclosed in Table 2 were used to examine the performance of Ce and Zr substitutions into the K-glass.

TABLE 2

K-Glass Stoichiometric Compositions Incorporating Ce And Zr

| Composition | Si | K | Ca | Ce | Zr | $\Sigma \Delta G_{hydration}$ (kJ/mol) |
|---|---|---|---|---|---|---|
| KCS-1 | 47 | 40 | 13 | 0 | 0 | −40.4 |
| KCS-2 w-1 At % Zr | 47 | 40 | 12 | 0 | 1 | −37.8 |
| KCS-1 w-2 At % Zr | 47 | 40 | 11 | 0 | 2 | −35.3 |
| KCeSZ-1 | 45 | 45 | 0 | 8 | 2 | −32.5 |

In this example, one and two At % substitutions of Zr for Ca were employed in the KCS-1 composition to characterize the catalytic activity change due to the Zr doping. This amount of doping corresponded to an increase in the total $\Delta G_{hydration}$ relative to the KCS-1 compound with 1 and 2% doping yielding $\Delta G_{hydration}$ of −37.8 and −35.3 kJ/mol respectively. One composition with Ce substitution is also shown in Table 2 that incorporates both Ce and Zr substitution, and is termed KCeSZ-1. The KCeSZ-1 composition was created to fully substitute Ce for Ca while increasing the K content, and additionally doping Zr at 2 At % to maintain a theoretical composition of 45 At % Si, 45 At % K, 8 At % Ce, and 2 At % Zr.

While the example KCeSZ-1 composition includes 45 At % Si, 45 At % K, 8 At % Ce, and 2 At % Zr, the At % of Silicon, Potassium, Cerium, and Zirconium may vary as desired and/or for various operating conditions. For example, the composition may comprise anywhere from approximately 30 At % Si and/or K to approximately 70 At % Si and/or K, including various combinations thereof. Furthermore, the composition of each of Cerium and Zirconium may vary within the range of approximately 0 At % to approximately 10 At %. Optimization of the various percentages of Si, K, Ce, and Zr may be determined through any suitable means.

Thin film glass coated cordierite filter slices were created by the vacuum sol gel dip coating methodology as previously described. In this manner, sols were created for the new compositions by using $Ce(NO_3)_3 \cdot 6H_2O$ (98% Alfa Aesar) and Zirconium (IV) isopropanol ispropoxide complex (Alfa Aesar) as precursors for Ce and Zr. Glacial acetic acid (J.T. Baker) was added in a 1:1 molar ratio directly to Zr powder to act as a chelating agent to slow the zirconium condensation reaction and thus elongate the gelation time. Isopropanol (70% v/v in $H_2O$) in a 4-1 volume ratio relative to the acetic acid volume was added to this separate mixture. The stabilized Zr solution was then added dropwise to the TEOS sol before the addition of the nitrate precursor solution. The excess nitrates compared to the total KCS-1 nitrate amount, added by the Ce precursors, was stabilized in the sol by the addition of equivalent molar amounts of excess 10 wt % malic acid. In this manner, the sol was properly stabilized and the gelation time of the sol was ~1 week for the KCS-1 with 1 and 2 At % Zr and ~5 days for the KCeSZ-1 composition. 8×8×3 mm (length×width×height) cordierite filter slices were then vacuum dip coated once the sol reached 10 cP. Excess sol was then blown off with gently flowing air and the heat process was conducted as follows: 24 h capped vial 60° C., 24 h capped vial 90° C., 1.5 h 615° C., 15 minutes 650° C., and furnace cool to room temperature.

To investigate the effects compositional changes imposed on the catalytic soot oxidation activity and hydrothermal durability, both sol gel dip coating of cordierite filter slices and bulk glass slices synthesized by high temperature melting were created for testing. Catalytic activity characterization was performed for the as-made coated cordierite samples using HR-TGA soot oxidation experiments with a 10:1 catalyst to soot ratio utilizing flame soot deposition created from sulfur-free fuel. The previously described high resolution temperature ramp program was used to modulate a 20° C./min ramp slowing to 2° C./min at the onset of measured weight loss.

HR-TGA was also used to measure the catalytic degradation of the KCeSZ-1 coated cordierite samples after hydrothermal exposures. The KCeSZ-1 coated cordierite samples were exposed to 2 h hydrothermal treatments (7%

$H_2O$ vapor in air) at temperatures of 300, 500, 600, and 700° C. These TGA measured oxidation temperatures were then compared to the KCS-1 coated cordierite catalyst oxidation performance after equivalent hydrothermal treatments.

Samples of the KCeSZ-1 melt glass were synthesized by high temperature melting of the oxide components. $K_2CO_3$, $CeO_2$, $SiO_2$, and $ZrO_2$ (98% Alfa Aesar) were mixed in stoichiometric amounts by mortar and pestle. The glass was then created by heating the mixture to 1400° C. for 6 h followed by subsequent furnace cooling. An excess 4 mol % K was added to the precursor mixture to replace the volatilized K from the glass melt due to the high furnace temperature. The bulk melt glass was then cut into 8×5×3 mm (length×width×height) samples and polished using SiC and $Al_2O_3$ pads (SiC: 180, 600 grit; $Al_2O_3$: 12, 3, 0.5 µm). These samples were then dry polished (i.e. polishing without $H_2O$ or other medium to ensure no leaching of K) to a scratch free surface.

Composition Analysis of Zr, Ce K-Glass Coatings

Elemental composition analysis was performed after sol gel dip coating of the KCeSZ-1 cordierite filter slices and high temperature melt synthesis of the flat glass slices. XRF was used to measure the composition of both KCeSZ-1 filter slices and melt glass samples. Table 3 provides the XRF measured compositions for the two KCeSZ-1 sample types compared to the measured compositions of the KCS-1 samples.

TABLE 3

Composition of KCeSZ-1 And KCS-1 Catalyst Samples (XRF) XRF At %

| Catalyst Composition/ Substrate | Si | K | Ca | Ce | Zr |
|---|---|---|---|---|---|
| KCS-1 Melt Glass As Made | 46.4 ± 0.0695 | 38.2 ± 0.123 | 15.4 ± 0.0537 | — | — |
| *KCS-1 on Cordierite As Made | 75.7 ± 0.488 | 16.2 ± 0.497 | 8.09 ± 0.234 | — | — |
| KCeSZ-1 Melt Glass As Made | 52.4 ± 0.400 | 39.5 ± 0.453 | — | 5.16 ± 0.0745 | 2.94 ± 0.0440 |
| *KCeSZ-1 on Cordierite As Made | 70.6 ± 2.32 | 20.2 ± 1.81 | — | 7.64 ± 2.55 | 1.52 ± 0.154 |

*Substrate detected in measurement

Because the thin glass film deposited on the cordierite filter slices maintains a thickness of only 1-2 micron, the compositional measurements of these samples detects a substantial amount of signal from the underlying substrate material. Because of this, neither EDS nor XRF are suitable techniques to accurately determine the catalyst composition. No K, Ce, or Zr was measured in the substrate material prior to sample coating. The K content of the both measured melt glass compositions KCS-1 and KCeSZ-1 are lower than the nominal compositions. This is due to the volatilization of K from the melt at the elevated synthesis temperatures required to melt the precursors (1200-1400° C.).

Catalytic Activity Characterization by HR-TGA

Figure 6:
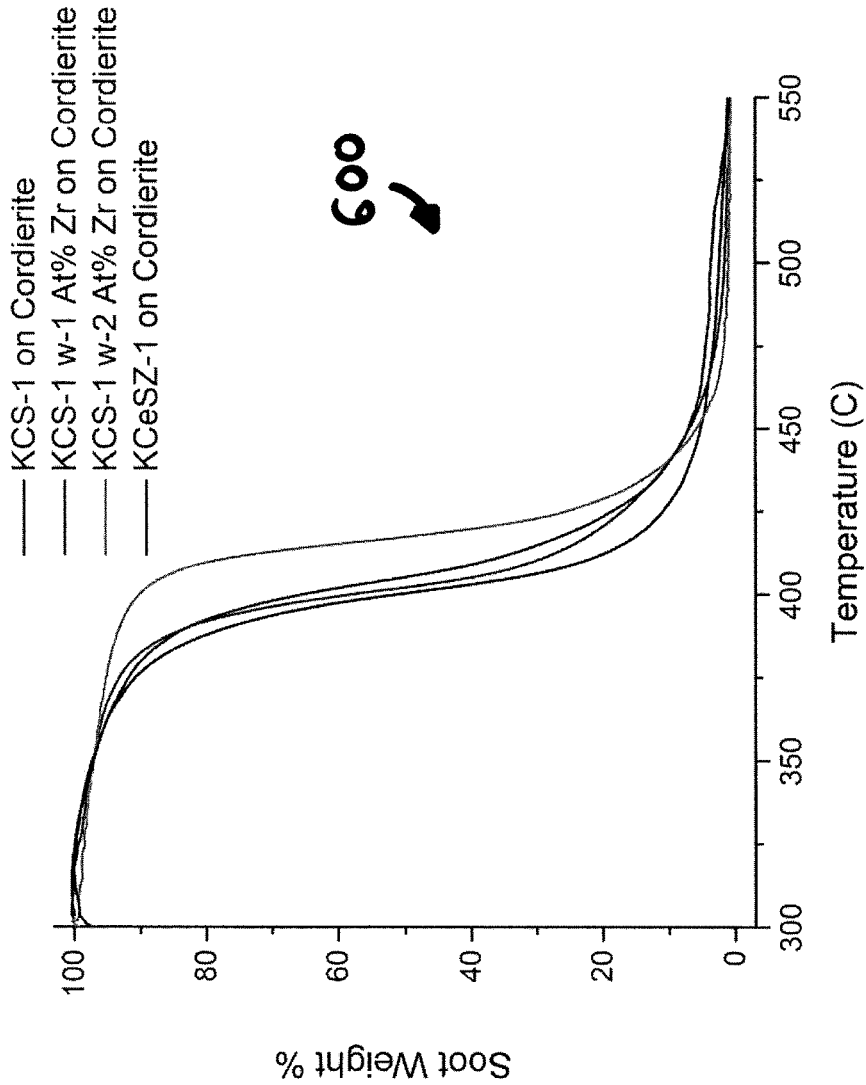
FIG. 6 shows a plot of a soot oxidation weight loss curve for various compositions of Potassium glass incorporating Cerium and Zirconium.
Figure 7A:
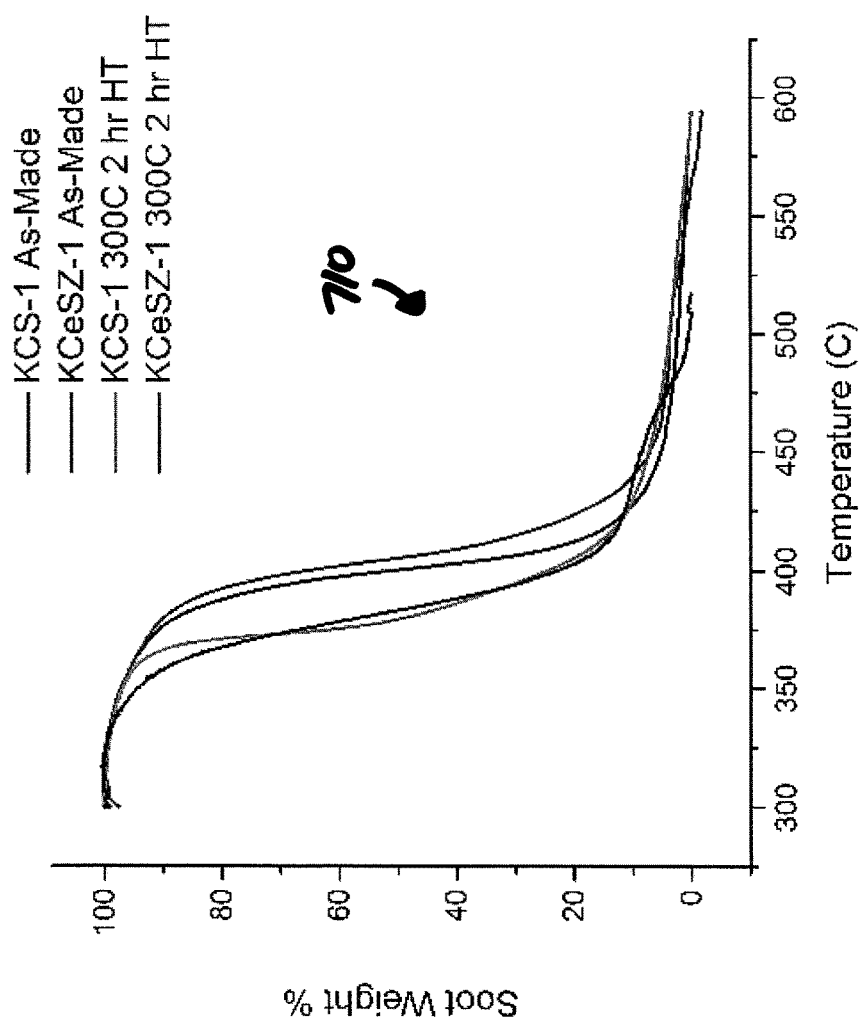
FIGS. 7A-7D show plots of HR-TGA soot weight loss curves for various glass catalysts at identified temperatures.
Figure 7B:
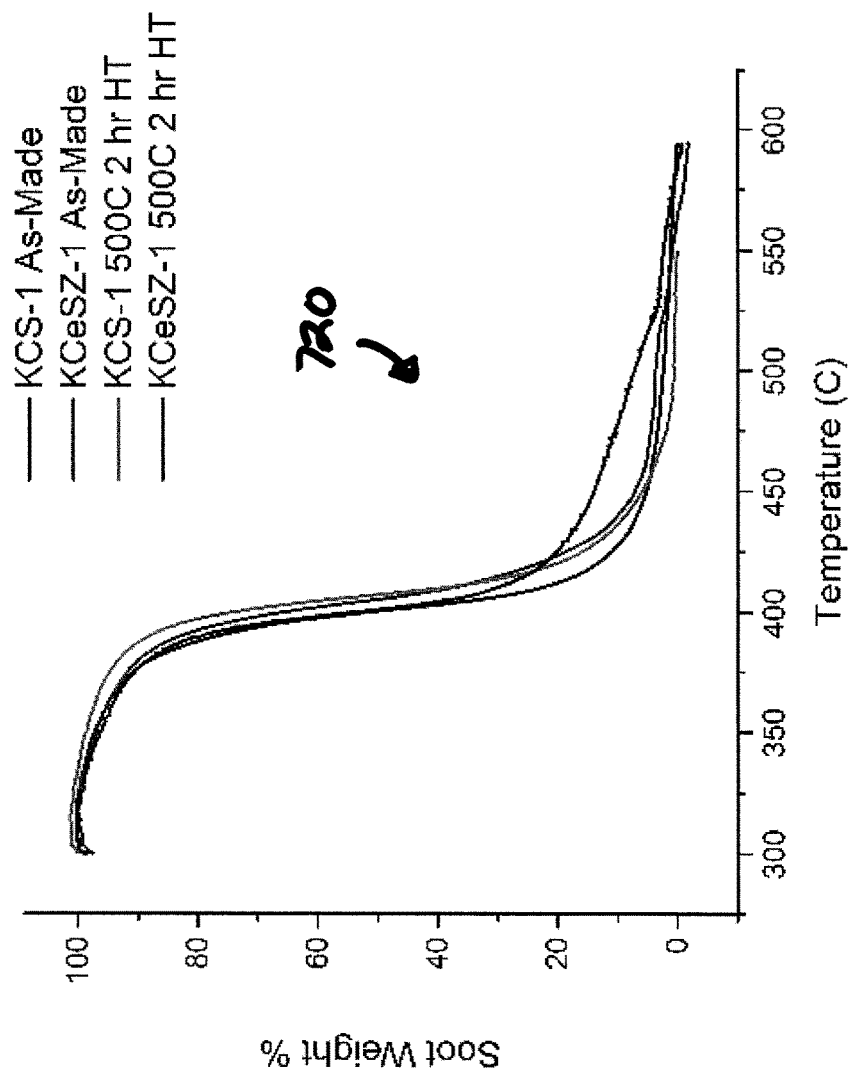
Figure 7C:
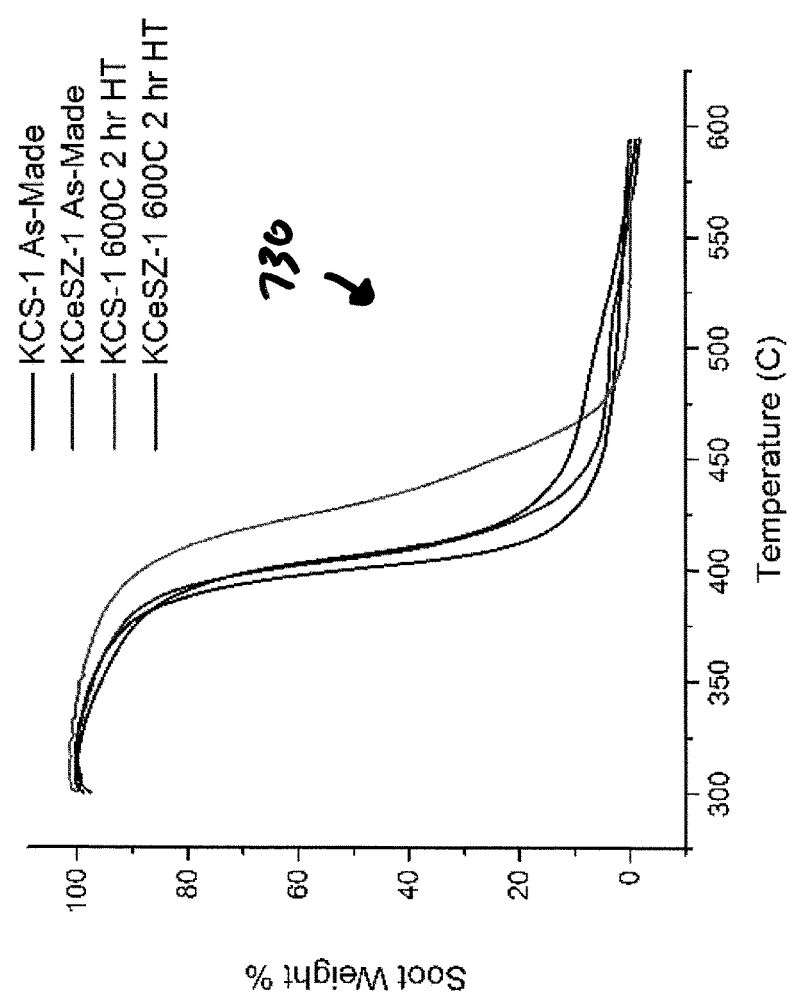
Figure 7D:
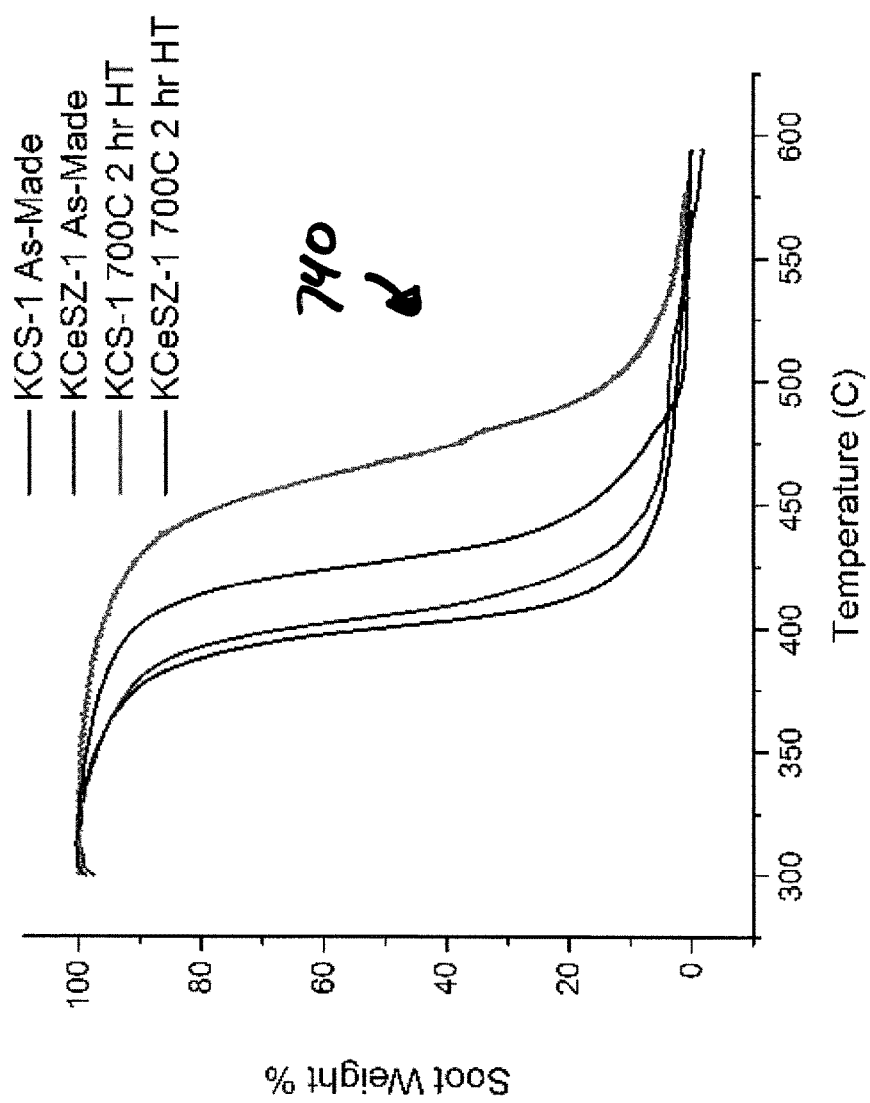

The initial HR-TGA measured catalytic soot oxidation performance was used as a first comparative screening parameter for the newly synthesized compounds. FIG. 6 illustrates a plot 600 comparing the HR-TGA measured soot weight loss curves of KCS-1 w-1 At % Zr, KCS-1 w-2 At % Zr, and KCeSZ-1 coated cordierite samples against the baseline oxidation activity of the KCS-1 coated cordierite catalyst.

As can be seen, two of the catalyst compositions (KCS-1 w-1 At % Zr and KCeSZ-1) performed similarly to the KCS-1 coated cordierite catalyst: Substitution of 2 At % Zr for Ca in the KCS-1 composition ("KCS-1 w-2 At % Zr") decreased the soot oxidation activity to oxidation temperatures of 407.6 and 417.3° C. for $T_{ig}$ and $T_{50}$ respectively. For reference, the average as-made soot oxidation temperatures for the KCS-1 on cordierite samples are 390 and 408° C. for $T_{ig}$ and $T_{50}$ respectively. Small additions of Zr to the KCS-1 glass composition may improve the chemical durability of the glass in hydrothermal environments by strengthening the surface against restructuring. However, the presence of Ca in the glass makes it possible that some Ca can still leach to the surface and lower the catalyst activity by forming inactive precipitates.

Because of this possible degradation mechanism, testing was focused on the KCeSZ-1 composition as a more promising catalyst. As seen above, by replacing all of the Ca in the glass with Ce and a small amount of Zr, the KCeSZ-1 composition provides equivalent soot oxidation performance compared to the KCS-1 composition without the catalytically inactive Ca element.

Hydrothermal Testing of KCeSZ-1 Glass Composition

To study the chemical degradation characteristic of the KCeSZ-1 glass composition in comparison to KCS-1, a series of hydrothermal experiments were conducted at temperatures ranging from 300-700° C. The hydrothermal environment was created by flowing air through a water bubbler to accumulate 7% $H_2O$ vapor. KCeSZ-1 coated cordierite samples were exposed to the synthetic hydrothermal environment for 2 hours at various temperatures. The degree of catalytic soot oxidation degradation was characterized by soot oxidation temperatures measured by HR-TGA before and after the hydrothermal treatments. FIGS. 7A-7D shows the resulting weight loss curves from the HR-TGA soot oxidations after hydrothermal treatments, along with those for KCS-1. More particularly, FIGS. 7A-7D show the HR-TGA soot weight loss curves for KCS-1 and KCeSZ-1 on cordierite samples comparing soot oxidation behavior as-made and after 2 hours hydrothermal treatments at 300° C. (plot 710), 500° C. (plot 720), 600° C. (plot 730), and 700° C. (plot 740)

Table 4 shows the corresponding $T_{ig}$ and $T_{50}$ soot oxidation temperatures for the KCeSZ-1 coated cordierite samples after the hydrothermal treatments extracted from the curves shown in FIGS. 7A-7D. The measured $T_{ig}$ and $T_{50}$ temperatures for the KCS-1 coated cordierite samples exposed to equivalent hydrothermal treatments are also provided for comparison of the relative activity degradation.

TABLE 4

HR-TGA Measured Tig and $T_{50}$ of KCS-1 AND KCeSZ-1 on Cordierite after 2 h Hydrothermal Exposures

| Hydrothermal Temperature | KCS-1 | | KCeSZ-1 | |
|---|---|---|---|---|
| 2 h Exposure | Tig (° C.) | T50 (° C.) | Tig (° C.) | T50 (° C.) |
| As-Made | 387.6 | 405.0 | 390.4 | 405.3 |
| 300 | 367.6 | 379.5 | 359.2 | 384.2 |
| 500 | 387.0 | 401.0 | 387.6 | 401.0 |
| 600 | 412.6 | 430.3 | 390.8 | 406.4 |
| 700 | 425.0 | 467.9 | 409.7 | 427.2 |

As shown in Table 4, for the hydrothermal treatments of 300, 500, 600, and 700° C. the measured Tig temperatures for the KCeSZ-1 coated cordierite samples were 359.2, 387.6, 390.8, and 409.7, respectively. For equivalent hydrothermal treatments of the KCS-1 coated catalyst, the measured Tig temperatures for the KCS-1 catalyst were 367.6, 381.6, 412.6, and 425.0° C., respectively. Therefore, at the higher temperatures (600, 700° C.) where the hydrothermal environment is more aggressive and more deactivation might be expected to occur, the KCeSZ-1 coated cordierite catalyst had $T_{50}$ oxidation temperatures that were ~24° C. and ~40° C. lower, respectively, than the KCS-1 coated samples. Hence the KCeSZ-1 glass catalyst without Ca outperformed the Ca-containing KCS-1 catalyst.

Figure 8:
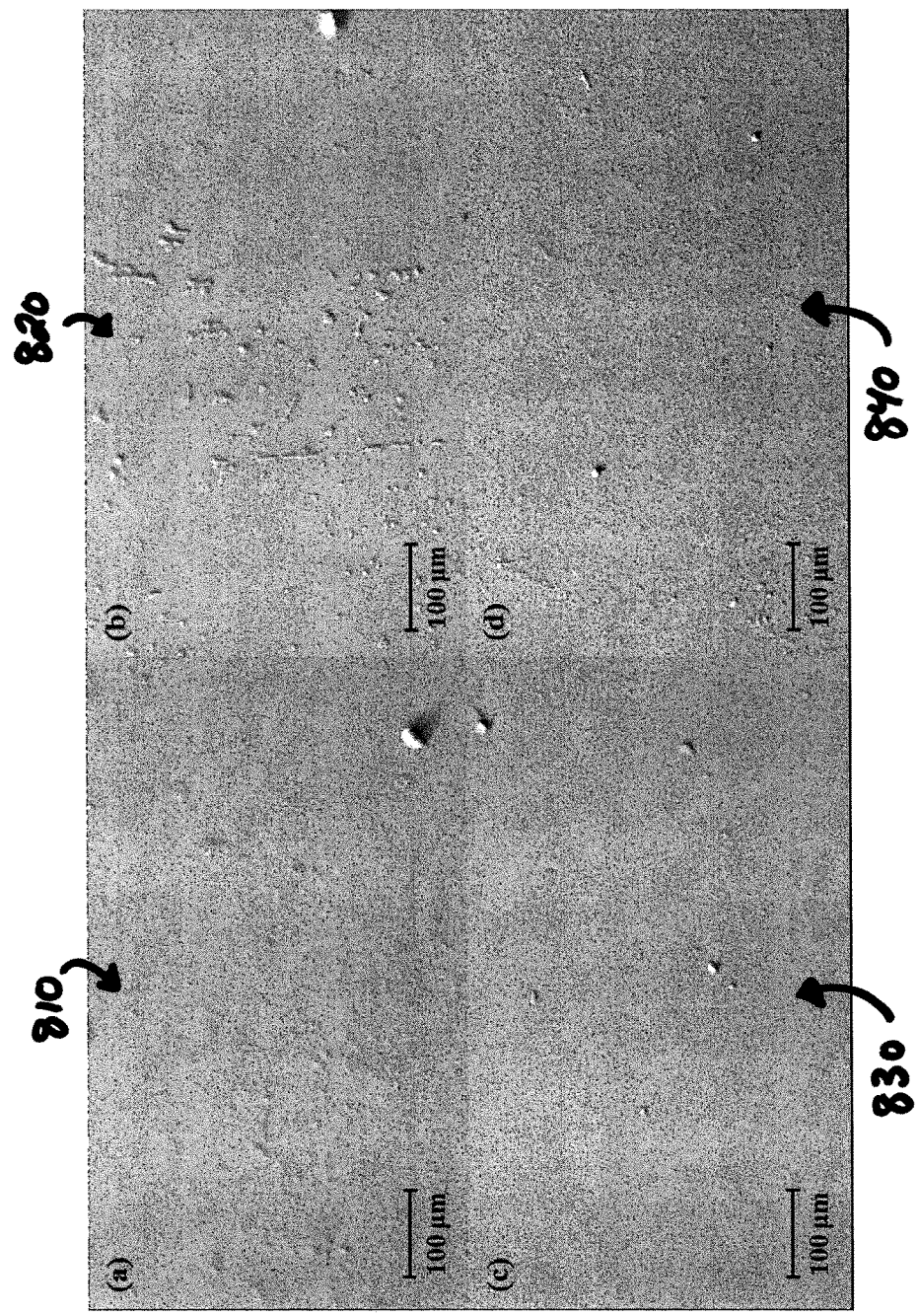
FIG. 8 shows SEM images of another example glass catalyst surface after hydrothermal exposures.

Furthermore, flat, polished samples of the KCeSZ-1 glass composition were fabricated and exposed to the equivalent hydrothermal testing as the coated cordierite samples to visualize the chemical degradation of the surface caused by the hydrothermal environment. FIG. 8 shows the SEM images of the KCeSZ-1 glass after 2 hour hydrothermal exposures (~7% $H_2O$ in air) at temperatures of (a) 300° C. (reference 810) and (b) 500° C. (reference 820) (c) 600° C. (reference 830) and (d) 700° C. (reference 840). As with the TGA data, these surfaces show a difference compared to their KCS-1 counterparts (shown in FIG. 4).

It is immediately apparent from FIG. 8 that the KCeSZ-1 glass experienced less surface degradation in the form of second phase formation than the KCS-1 glass at all temperatures. Specifically, the KCeSZ-1 glass shows minimal precipitate formation at 300° C. (810), 600° C. (830), and 700° C. (840) with only small precipitates forming at 500° C. (820). Some precipitates form, but they are smaller and there are fewer of them than the comparable KCS-1 glass samples.

EDS compositional measurements were performed at higher magnification of 2.5 kx on these KCeSZ-1 glass samples hydrothermally exposed at temperatures of 300-700° C. Table 5 shows the average compositional measurements of 5 point spectra each of the precipitates and surrounding flat glass per sample. Area EDS scans of ~1 mm were also used to compare the compositional change of the near surface at the various hydrothermal treatment temperatures. Error shown is the standard deviation of the measured At % of the 5 point spectra.

TABLE 5

EDS Measured Composition of KCeSZ-1 Glass Surface After 2 h Hydrothermal Exposures at Various Temperatures KCeSZ-1 Glass (EDS At %)

| Hydrothermal Temperature | O | Si | K | Ce | Zr |
|---|---|---|---|---|---|
| Point Spectra Precipitates | | | | | |
| 300 | 65.8 ± 8.53 | 16.7 ± 4.31 | 15.5 ± 4.54 | 1.37 ± 0.413 | 0.556 ± 0.139 |
| 500 | 54.2 ± 8.25 | 22.1 ± 2.89 | 20.4 ± 4.57 | 1.87 ± 0.273 | 1.51 ± 0.750 |
| 600 | 63.5 ± 5.50 | 17.9 ± 4.38 | 16.4 ± 1.19 | 1.62 ± 0.529 | 0.616 ± 0.142 |
| 700 | 64.4 ± 2.56 | 19.3 ± 0.967 | 14.1 ± 1.72 | 1.60 ± 0.144 | 0.558 ± 0.0810 |
| Point Spectra Flat Glass | | | | | |
| 300 | 76.5 ± 1.13 | 12.7 ± 0.543 | 9.49 ± 1.23 | 1.00 ± 0.0488 | 0.350 ± 0.0157 |
| 500 | 70.3 ± 0.978 | 15.7 ± 0.482 | 11.8 ± 0.445 | 1.74 ± 0.0391 | 0.483 ± 0.0336 |
| 600 | 59.9 ± 1.08 | 21.1 ± 0.575 | 16.2 ± 0.442 | 2.10 ± 0.0367 | 0.758 ± 0.0792 |
| 700 | 66.2 ± 3.82 | 18.7 ± 1.91 | 13.0 ± 1.69 | 1.57 ± 0.158 | 0.540 ± 0.0978 |
| ~1 mm Area EDS | | | | | |
| 300 | 66.4 | 18.0 | 13.6 | 1.46 | 0.569 |
| 500 | 65.5 | 18.5 | 13.7 | 1.55 | 0.732 |
| 600 | 65.5 | 18.2 | 14.1 | 1.53 | 0.681 |
| 700 | 64.8 | 19.0 | 14.1 | 1.43 | 0.633 |

As shown, the resulting compositions were greatly dependent on the thickness of the measured precipitates due to the penetration depth of the EDS measurement. All of the precipitates measured high in potassium content relative to the surrounding flat glass. Potassium content (At %) of the precipitates measured a maximum of 20.4 after 500° C. hydrothermal treatment and a minimum of 14.1 after 700° C. hydrothermal exposure. The flat glass surrounding the precipitates showed values between 9.49 to 16.2 At % K, which correspond to the 300° C. and 600° C. hydrothermal treatments respectively. Without including the oxygen content in the measured At % ratio, these K values correspond to 44.5 and 39.7 for the precipitates and 40.3 and 40.4 respectively. Comparing these values to the as made KCeSZ-1 glass composition (without oxygen) of 39.5 At % K, the precipitates measured slightly higher in K content while the surrounding glass was minimally affected by the hydrothermal treatment.

The improved resistance high temperature hydrothermal activity degradation (compared to KCS-1) results from the stronger chemical bonding in the silicate matrix due to the inclusion of network forming elements Ce and Zr substituting for Ca. These elements in the glass allow the stabilization of the K in the glass while also resisting the formation of a less active hydrated silicate layer indicative of potash-lime glasses. If one substitutes ions with much higher field strength such as Al, the resistance to degradation will be too high and the glass activity will diminish below acceptable levels.

Figure 9:
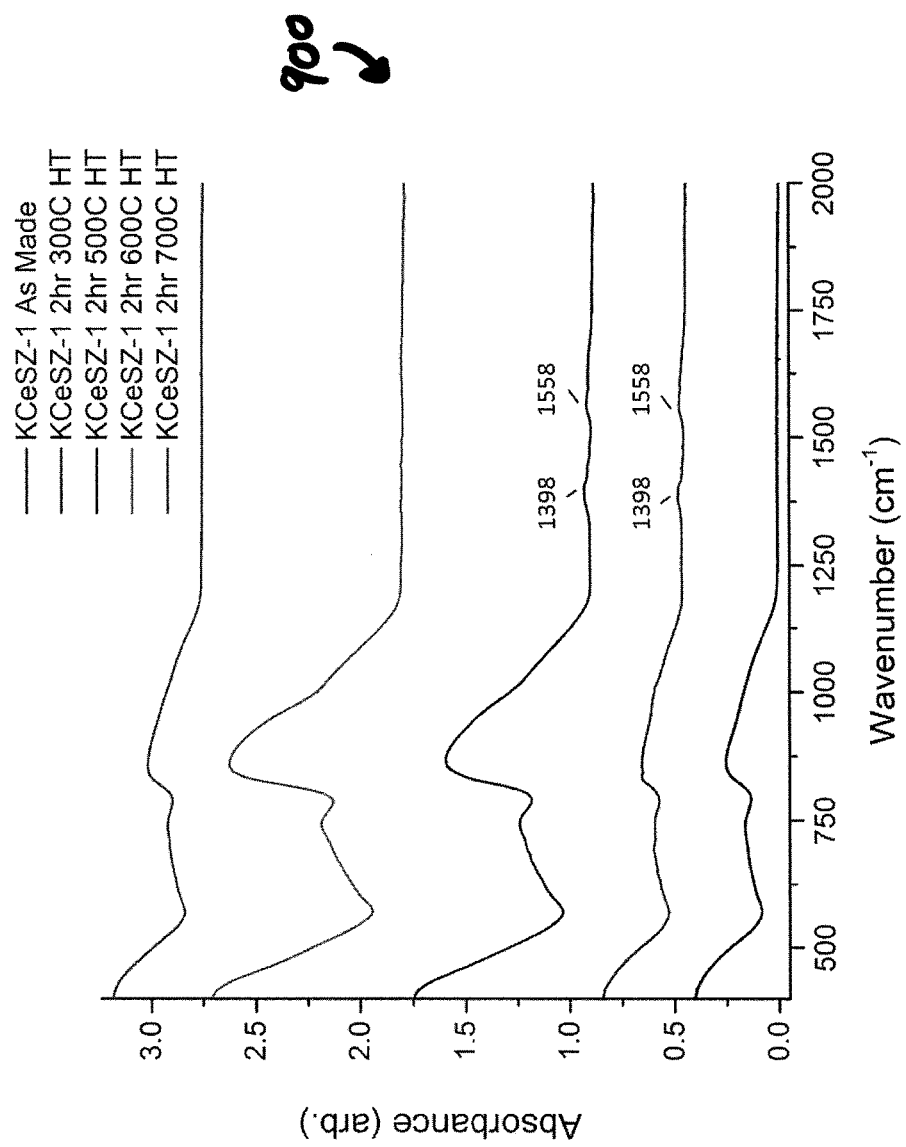
FIG. 9 shows an ATR-FTIR spectra of an example glass catalyst (KCeSZ-1) glasses exposed to hydrothermal treatments.

Characterization of the hydrothermally precipitates seen on the surface of the KCeSZ-1 glass was performed by ATR-FTIR. FIG. 9 shows a plot 900 of the measured spectra of the KCeSZ-1 glasses after 300° C., 500° C., 600° C., and 700° C. 2 hour hydrothermal treatments.

As shown in FIG. 9, because of the high durability of this composition, there was minimal difference in spectra measured after the 2 hour exposures. Only hydrothermal treatments at 300° C. and 500° C. created a high enough concentration of surface precipitates to yield a discernable change from the as made glass. In these two spectra, small peaks measured at 1398 and 1558 cm$^{-1}$ can be attributed to potassium carbonate formation as has been previously seen in KCS-1. SEM/EDS analysis confirms these precipitates as potassium rich and thus can be determined to be $K_2CO_3$.

This testing shows the KCeSZ-1 glass leaching mechanism is similar to the KCS-1 glass, but with greater resilience to the hydrothermal environment that was previously seen in the KCeSZ-1 coated cordierite hydrothermal testing. Importantly, no $CaCO_3$ precipitates are seen, so there are no regions without active $K^+$ ions.

Accordingly, non-carbonate forming, higher field strength/lower free energy of hydration ions can be substituted for Ca in K—Ca—Si—O glasses to improve the hydrothermal stability of catalytic activity for soot oxidation. Increased substitution of these ions (within limits) increases chemical durability while still permitting relatively facile $K^+$ ion exchange, without unwanted inactive carbonate (i.e. $CaCO_3$) formation on the catalyst surface.

More preferably, replacing the stabilizing ion Ca in the K-glass composition with an ion (e.g. Ce) that can provide stabilization of the K ions in the silicate matrix while also being catalytically active in soot oxidation could improve the useful lifetime performance of the glass catalyst.

The new glass composition disclosed herein (45Si-45K-8Ce-2Zr) exhibits improved hydrothermal stability than similar glasses (e.g. KCS-1) containing Ca.

It is expected that a similar improvement in glass performance will result substituting from alternative ions that share chemical characteristics with Ce and Zr. Hence for Ce, combinations of ions including Sc, Y, La, Pr, Nd, Sm, Eu, Gd, Tb, Dy, Ho, Er, Tm, Yb, Lu and other $3^+$ ions could be substituted. For Zr, ions including Ti, Hf, and other $4^+$ ions could be substituted.

Finally, new glass composition disclosed herein (45Si-45K-8Ce-2Zr) may exhibit possible NO reduction since $CeO_2$—$ZrO_2$ systems have been shown to both absorb and reduce $NO_R$.

Figure 10:
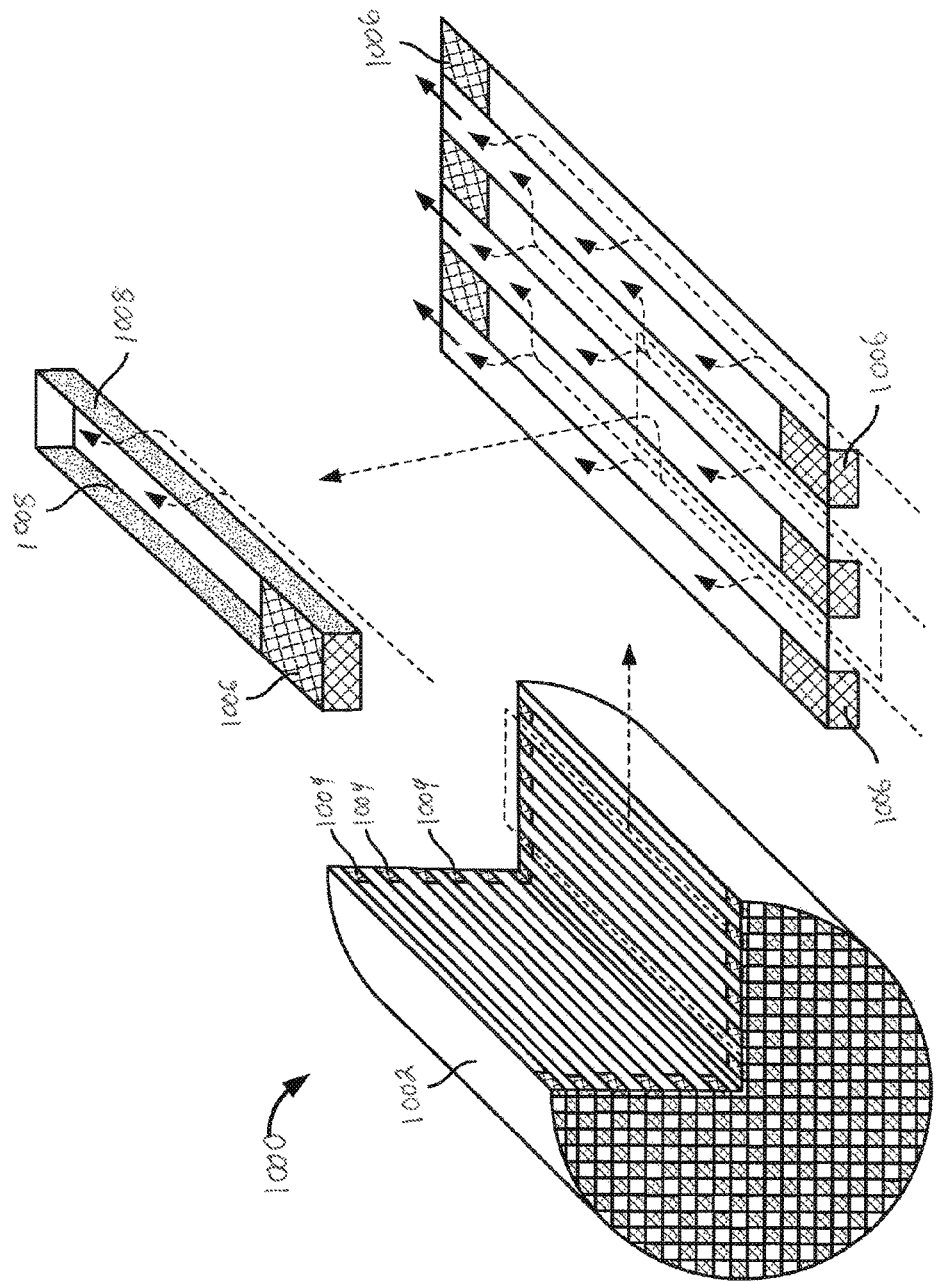
FIG. 10 is a partial cross-sectional and exploded view of an example diesel particulate filter which may be suitable for carrying the example glass catalyst of the present disclosure.

An example diesel particulate filter (DPF) 1000 is shown in FIG. 10. The example DPF 1000 is designed to be positioned in the exhaust of a vehicle and collect solid and liquid particulate emissions such as, for example, soot. The example DPF 1000 is able to be able to constantly withstand the high temperatures of diesel exhaust gas (e.g., up to approximately 975 K). The DPF 1000 may also be subject to temperatures over 1250 K that are caused by exothermic reactions during oxidation of soot trapped in the DPF 1000.

In addition, the pressure drop over the DPF 1000 should be low to avoid decreasing engine performance. The example DPF 1000 comprises a substrate 1002, which in this example is a high efficiency filter that may be made of cordierite or silicon carbide as noted above. Other example filters may include ceramic foam, candle filters, wire mesh, metal wool, and/or any type of suitable substrate.

The example substrate 1002 is a ceramic structure that include parallel channels 1004, of which half are closed at the upstream end in an alternate, checkerboard manner, and the other half are closed at the downstream end by, for example, a ceramic plug 1006. The channels 1004 have porous walls 1008 through which exhaust gases are forced. The walls 1008 act as filters and trap particulates. Collected particulates in the DPF 1000 accumulate over time and block the micropores of the walls 1008 of the channels 1004, which increases the back pressure drop of the diesel engine and reduces the engine performance.

To maintain maximum performance, the DPF 1000 should be regularly regenerated or cleaned by, for example, periodically burning the accumulated particles, i.e., soot combustion, as detailed above. Thus, the example DPF 1000 comprises a glass catalyst manufactured in accordance with the teachings of the present invention and disposed on the surface of the substrate 1000. In other words, because the spontaneous combustion temperature of carbon (soot) is about 600° C., and the temperature of diesel exhaust is in the range of 150-400° C., external energy would be needed to heat the diesel exhaust to the temperature necessary for soot combustion. However, catalytic regeneration of the DPF 1000, which may occur by adding a glass catalyst such as, for example the above-described KCeSz-1 catalyst or any other suitable catalysts, lowers the ignition temperature of the soot to a temperature within the range of the temperature of diesel exhaust.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A diesel soot filter comprising:
   a substrate having a surface disposed at least partially within a fluid path of the diesel soot filter; and
   a glass catalyst disposed on the surface of the substrate such that an exhaust gas contacts at least a portion of a surface of the glass catalyst as the exhaust gas moves within the diesel soot filter, the glass catalyst comprising:
   a plurality of alkali metal ions disposed within the glass catalyst and releasable to the surface of the glass catalyst at a controlled rate sufficiently fast to supplement the lost alkali metal ions at the surface of the glass catalyst, wherein the alkali metal ions combust with the soot as the exhaust gas travels along the fluid path, and wherein an oxide basis of the glass catalyst comprises Silicon (Si), Potassium (K), Cerium (Ce), and Zirconium (Zr).

2. A diesel soot filter as defined in claim 1, wherein the weight percentage of the oxide basis of the glass catalyst is about 45 At % Si, 45 At % K, 8 At % Ce, and 2 At % Zr.

3. A diesel soot filter as defined in claim 1, wherein the weight percentage of the oxide basis of the glass catalyst comprises greater than 0 At % Ce to approximately 10 At % Ce and greater than 0 At % Zr to approximately 10 At % Zr.

4. An apparatus for eliminating particulate emissions in an exhaust gas comprising:
- a filter having an inlet, an outlet, and an fluid path therebetween, wherein the exhaust gas moves from the inlet to the outlet through the fluid path;
- a substrate having a surface and a glass catalyst disposed on the surface of the substrate and at least partially within the fluid path such that the exhaust gas contacts at least a portion of a surface of the glass catalyst disposed on the surface of the substrate as the exhaust gas moves from the inlet to the outlet; and
- a plurality of alkali metal ions disposed within the glass catalyst and releasable to the surface of the glass catalyst at a controlled rate, wherein the alkali metal ions combust with the particulate emissions as the particulate emissions travel along the fluid path, and
- wherein the composition by weight percentage of an oxide basis of the glass catalyst is about 45 At % Si, 45 At % K, 8 At % Ce, and 2 At % Zr.

5. An apparatus as defined in claim 4, further comprising a plurality of channels formed between the inlet and the outlet, wherein each of the channels forms a fluid path.

6. An apparatus as defined in claim 5, wherein the plurality of channels are formed by at least one of an inert ceramic or metal, and wherein the glass catalyst at least partially coats the formed channels.

7. An apparatus as defined in claim 5, wherein the glass catalyst is devoid of Calcium (Ca).

* * * * *